March 4, 1958 J. P. RUG 2,825,804
LOCAL RECEPTION SELECTOR FOR SIGNAL SEEKING RECEIVER
Filed Oct. 29, 1954
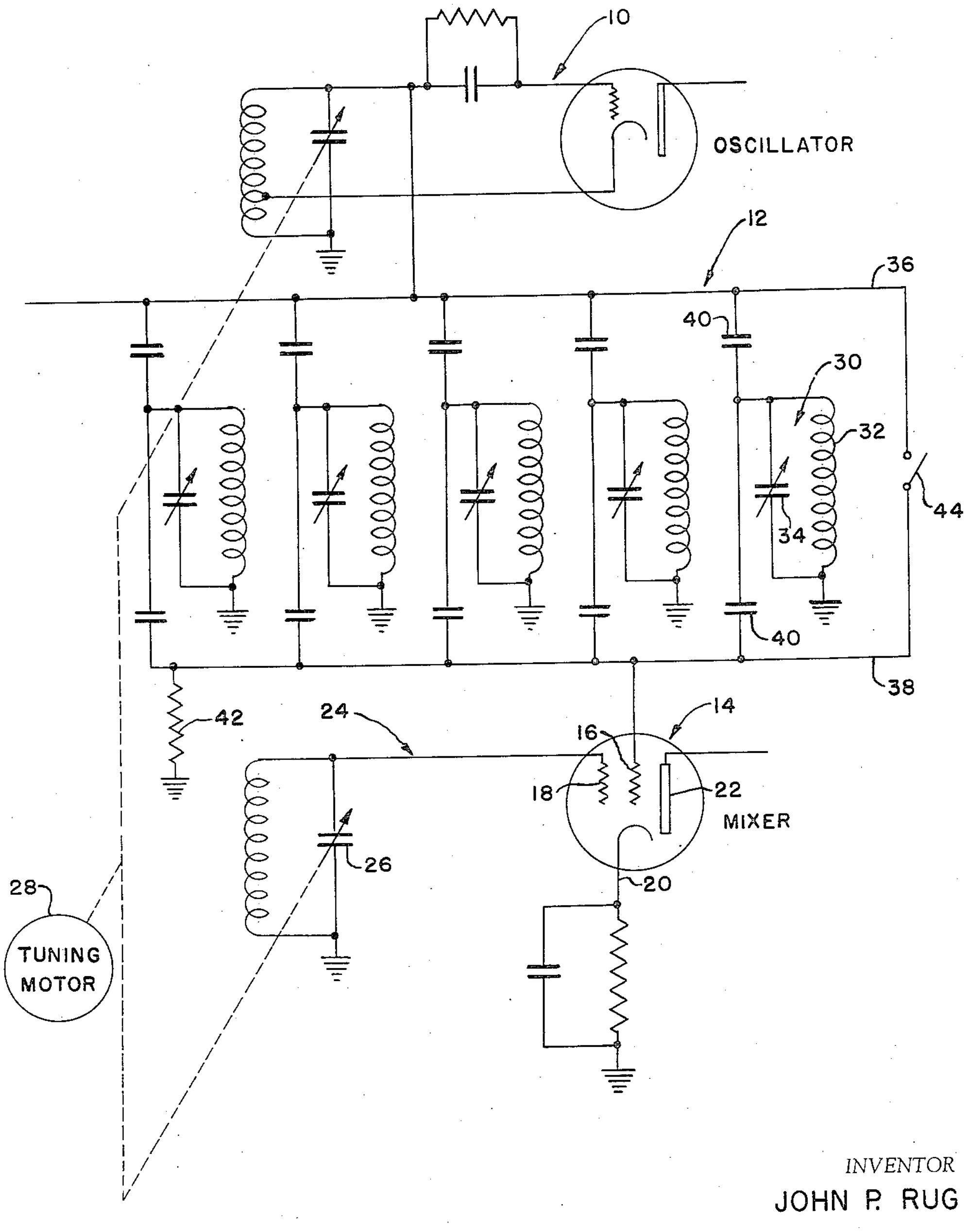
INVENTOR
JOHN P. RUG
BY Michael Herz
ATTORNEY United States Patent Office 2,825,804

Patented Mar. 4, 1958

2,825,804

LOCAL RECEPTION SELECTOR FOR SIGNAL SEEKING RECEIVER

John Peter Rug, Buffalo, N. Y., assignor to Sylvania Electric Products Inc., a corporation of Massachusetts Application October 29, 1954, Serial No. 465,545

8 Claims. (Cl. 250—20)

This invention relates to channel selectors for signal seeking receivers.

Signal seeking receivers in the broadcast band have been made in which means are provided for scanning the broadcast spectrum and selecting from it, sequentially, in order of ascending or descending frequency, all channels whose signals are in excess of a selected minimum strength. This type of receiver is described, for example, in the patent to Nicholson, Jr., 2,472,957, granted June 14, 1949. Other signal seeking receivers have been made in which mechanical means are provided for stopping the scanning action of a receiver only at certain pre-selected strong signal channels out of all those to which the scanning stopping mechanism is sensitive. Such a receiver is shown, for example, in the patent to Gull 2,572,926, granted October 31, 1951.

It is an object of this invention to effect stoppage of the scanning mechanism in a signal seeking receiver not only by reason of the strength of the incoming signal but by reason of pre-selected frequency response setting of purely electrical means. In this manner only those strong stations may be selected, out of a group of strong signal stations, to which it is desired to listen.

Signal seeking receivers are usually of the superheterodyne variety involving the use of an intermediate fixed frequency amplifier, a tunable local oscillator and a converter or mixer for converting a selected frequency incoming signal, as beat against by the local oscillator, to the frequency of the fixed frequency amplifier. If the signal from the oscillator to the converter or mixer be weakened, as by interposing an attenuating circuit between the oscillator and oscillator grid of the mixer, a weak or no intermediate frequency signal would be created and the stopping mechanism of the scanning mechanism of the receiver would then be rendered inoperative.

It is a further object of this invention to provide such an attenuating mechanism between the oscillator or oscillator circuit and the converter or mixer for determining channel selection operation of the scanning mechanism.

It is a still further object of the invention to make this attenuating means purely automatic in operation as well as entirely of electrical means.

These and other objects will become apparent after reading the following specification and claims, when taken in conjunction with the accompanying drawing, in which the figure schematically represents the tuning end of a signal receiving receiver, here shown by way of example as comprised of a separate oscillator tube and mixer.

Referring to the drawing in greater detail, at 10 there is shown a conventional Hartley oscillator circuit, although obviously, insofar as this invention is concerned, any other type of oscillator may be employed. The voltage from the oscillator is fed via a network 12 to a mixer tube 14. The mixer tube has an oscillator input grid 16, a signal input grid 18, a cathode 20 and an anode

22. The grid 18 is fed with a selected signal from the broadcast spectrum, via an L—C combination 24 involving a variable condenser 26, as is conventional in the art.

The condenser 26 and the variable condenser of the Hartley oscillator are ganged together and rotated by a tuning motor 28 operated or idle in accordance with the strength of the signal passing through the signal seeking receiver. This will be understood by considering the relation of the tuning motor to the receiver in the Nicholson, Jr., patent referred to above. It is sufficient here to state that if a weak signal is passing through the receiver, the motor will be operative to shift the condensers, while if a strong enough signal, as determined by the sensitivity setting of the receiver, is passing through the receiver, the motor will be caused to become inoperative.

The signal strength passing through the receiver, in accordance with the present invention is determined in part by the signal received at the grid 18 and in part by the signal injected into the oscillator grid 16 as controlled by the network 12.

The network 12 is comprised of a parallel grouping of tuned circuits or sections 30, here shown as tank circuits, though other tuning means may be employed, and each tank circuit is here shown as comprised of an inductance 32 in parallel with a variable condenser 34. The variable condenser of the tuned sections may each be pre-set so that the tuned circuit responds to a selected channel of requisite strength, each section being responsive to a different channel. When the oscillator is operating at a frequency to which a tank circuit is not tuned, part of the signal at the tank circuit is shunted to ground. When the oscillator is operated at a frequency to which any tank circuit is tuned, the tank circuit offers to the signal a high impedance to ground and the signal is directed strongly to grid 16.

To prevent short circuiting of the signal to ground via the tuned sections, the tuned sections are isolated from ground and from the common lines 36, 38 feeding the sections by small fixed condensers of the order of 1 to 10 mmfd.

The line 38 is grounded via a high value resistor 42.

The impedance offered by the capacitors 40 are such as to prevent shorting out of the signal to ground when the oscillator is not at the frequency to which a tuned section responds, while the oscillator voltage is of sufficient amplitude to render control grid 16 effective when any one of the tuned sections is operative to block signal passage therethrough. When the oscillator is set at a frequency to which a section is tuned sufficient signal is injected into the tube 14 to cause a converted signal to pass through the intermediate amplifier of the receiver to effect stoppage of the tuning motor.

A switch 44 is provided to short out the tuned sections to enable the receiver to operate in accordance with the method described in the Nicholson, Jr., patent.

Although I have shown specific circuitry for attaining local oscillations and for tuning to different channels and utilized a pair of tubes for attaining the local oscillations and for mixing the signal, instead of a single converter tube, it is obvious that other tuning systems may be employed and other mixers or converters may be employed, all within the spirit of the invention as defined by the appended claims.

What is claimed as new is:

1. In a signal seeking receiver, the combination of a circuit tunable to the frequency of an incoming signal, a second circuit with variable means for tuning the frequency of a local oscillator, means for injecting the signal from the oscillator into the circuit controlled by the incoming signal and, a number of tuned means arranged in parallel relationship to each other, said means being tuned to different frequency channels, said parallelly arranged tuned means being serially connected between the output of the oscillator and the injecting means to determine the magnitude of a resultant frequency converted signal.

2. In a signal seeking receiver, the combination of a circuit tunable to the frequency of an incoming signal, a second circuit tuning the frequency of a local oscillator, means for injecting the signal from the oscillator into the circuit controlled by the incoming signal, a number of tuned means arranged in parallel relationship to each other, said means being tuned to different frequency channels, said parallelly arranged tuned means being serially connected between the output of the oscillator and the injecting means to determine the magnitude of a resultant frequency converted signal, and means, operative at will, to short circuit all of the parallelly arranged tuned means.

3. In a signal seeking receiver, the combination of a circuit tunable to the frequency of an incoming signal, a second circuit with variable means for tuning the frequency of a local oscillator, means for injecting the signals from the oscillator into the circuit controlled by the incoming signal comprising parallel tuned means, tuned to different frequencies, serially connected between the output of the oscillator and the injecting means to determine the magnitude of the frequency converted signals, and impedance means in series with each of the tuned means to prevent short circuiting of any signal impressed across the tuned means.

4. In a signal seeking receiver, the combination of a circuit tunable to the frequency of an incoming signal, a second circuit with variable means for tuning the frequency of a local oscillator, means for injecting the signals from the oscillator into the circuit controlled by the incoming signal comprising parallel tuned means, tuned to different frequencies serially connected between the output of the oscillator and the injecting means to determine the magnitude of the frequency converted signals, and impedance means in series with each of the tuned means to prevent short circuiting of any signal impressed across the tuned means and to reduce intercircuit reaction between the parallelly arranged tuned means.

5. In a signal seeking receiver, the combination of a circuit tunable to the frequency of an incoming signal, a second circuit with variable means for tuning the frequency of a local oscillator, means for injecting the signal from the oscillator into the circuit controlled by the incoming signal comprising a number of LC tuned sections in parallel to one another and connected in series with and between the output of the oscillator and the injecting means, and a condenser between each of the LC combinations and the oscillator output.

6. In a signal seeking receiver, the combination of a circuit tunable to the frequency of an incoming signal, a second circuit with variable means for tuning the frequency of a local oscillator, means for injecting the signal from the oscillator into the circuit controlled by the incoming signal comprising a number of LC tuned sections in parallel to one another and connected between the output of the oscillator and the injecting means, one end of each of the tuned sections being connected to a common line, a condenser between each of the LC combinations and the oscillator output, and additional condensers between one end of each of the LC combinations and the common line to minimize interaction between the tuned sections.

7. In a signal seeking receiver, the combination of a circuit tunable to the frequency of an incoming signal, a second circuit tuning the frequency of a local oscillator, means for injecting the signal from the local oscillator into the circuit controlled by the incoming signal comprising a line connected to the output of the local oscillator, a number of condensers each having one end connected to the line, a series of tuned sections each having one end connected to the other ends, respectively, of the condensers and each having the other ends connected to a common ground line, a third line having means connected thereto coupling into the incoming signal circuit, a second number of condensers each having one end connected to the third line and the other ends connected respectively to those ends of the LC sections which are connected to the first condensers, and a resistor shunting the third line to the common ground line.

8. In a signal seeking receiver, a local oscillator having tuning means, means feeding the output of the oscillator to a first line, a number of condensers in parallel with one another having one of their ends connected to the first line, a second common line, a number of parallelly arranged LC tuned sections between the other ends of the condensers and the second line, one section for each condenser, a third common line, a second number of condensers, each one connected to the second end of the first condenser and to the third line, a resistor between the third line and the second common line, a mixer tube having two grids, tunable means feeding an incoming signal to one of said grids, and a connection between the third line and said second grid, the tuning means of the local oscillator and the tuning means of the incoming signal both having one end connected to the second line.

References Cited in the file of this patent

UNITED STATES PATENTS

| | | |
|---|---|---|
| 2,011,941 | Snider | Aug. 20, 1935 |
| 2,186,980 | Lowell | Jan. 16, 1940 |
| 2,215,775 | Banfield | Sept. 24, 1940 |
| 2,341,632 | Libby | Feb. 15, 1944 |
| 2,383,322 | Koch | Aug. 21, 1945 |
| 2,516,272 | Thompson | July 25, 1950 |
| 2,580,051 | Torre et al. | Dec. 25, 1951 |
| 2,719,272 | Gannett | Sept. 27, 1955 |